Nov. 14, 1939.  E. H. LAND  2,180,113
TRANSLUCENT SCREEN
Filed Nov. 19, 1937
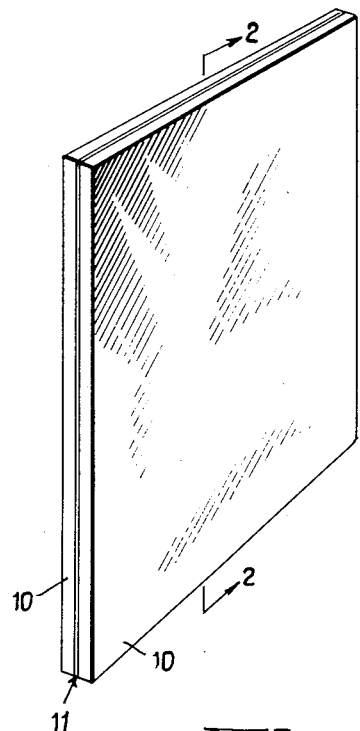
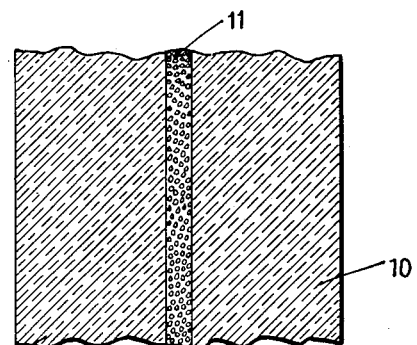
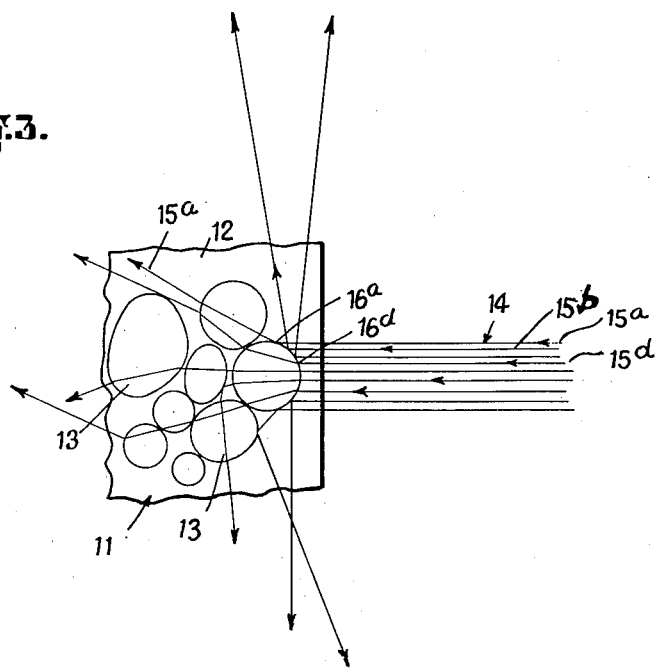
INVENTOR
Edwin H. Land
BY Brown & Jones
ATTORNEY Patented Nov. 14, 1939

2,180,113

UNITED STATES PATENT OFFICE 2,180,113

TRANSLUCENT SCREEN

Edwin H. Land, Wellesley Farms, Mass., assignor, by mesne assignments, to Polaroid Corporation, Dover, Del., a corporation of Delaware Application November 19, 1937, Serial No. 175,421

6 Claims. (Cl. 88—24)

This invention relates to new and improved translucent screens, and more particularly to non-depolarizing translucent screens.

An object of the invention is to provide a translucent screen, and more particularly a translucent screen adapted for use in connection with the viewing of projected images, which is adapted to diffuse substantially uniformly and over a wide area light such as polarized light, traversing the screen without depolarization of the transmitted light.

A further object of the invention is to provide such a screen which so diffuses refracted light that when the screen is viewed by an observer no grain in the screen is apparent.

A still further object of the invention is to provide such a screen which when viewed by an observer shows no points of scintillation.

Other objects of the invention are to provide a diffusing medium comprising a substantially homogeneous emulsion of a preferably transparent material in another preferably transparent material; to provide such an emulsion wherein the emulsified materials possess different indices of refraction; to provide supporting transparent elements adapted to hold and position the emulsion; and to provide a self-supporting set emulsion of a character adapted to function as a translucent screen.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention reference should be had to the following detailed description taken in connection with the accompanying drawing, in which:

Figure 1 is a perspective view of a translucent screen embodying one form of the invention;

Fig. 2 is a view in section greatly enlarged of a portion of the device shown in Fig. 1 along the lines 2—2; and Fig. 3 is a diagrammatic view, greatly enlarged, of a fragment of the emulsion forming a device embodying the invention, illustrating how such a device may act to diffuse a parallel beam or pencil of light.

In the drawing, 10 represents transparent holding- and positioning-elements, as for example sheets of smooth, clear glass, between which a diffusing emulsion 11 of a character hereinafter to be described may be positioned. This emulsion is preferably composed of a plurality of light transparent media having different indices of refraction. The materials employed are preferably of a character such that after the emulsion has been formed it will at least partially set so as to retain its position between the plates 10, irrespective of the plane in which the translucent screen may be held. It is to be understood, however, that the invention is not limited to the use of a set emulsion. It is possible under certain circumstances to employ a liquid emulsion, such for example as an emulsion of mineral oil and water.

Suitable materials for use in connection with the production of a plastic or set emulsion may be, for example, cellulose acetate plasticized with some suitable plasticizer, such as dimethyl phthalate and emulsified with glycerine. With the use of such materials a structure may be obtained such as is shown diagrammatically in the drawing, where 12 may be deemed representative of the cellulose acetate-dimethyl phthalate mixture, which may be considered as the continuous phase, and 13 may be deemed representative of the minute globules of glycerine or the discontinuous phase of the emulsion. It is to be understood that a wide range of materials may be employed to form the diffusing emulsion of the invention. It is essential only that the materials be such as may be used to form an emulsion, that they be trasparent, or substantially transparent, and that they possess different refractive indices. Emulsions of castor oil and "Santolite", or castor oil and "Rezyl," for example, may form highly satisfactory diffusing screens.

In the manufacture of the translucent screen of the invention, the diffusing emulsion may be spread upon one of the supporting plates 10 in a plastic or even fluid condition. The other supporting plate may then be brought into position and pressed firmly against the plastic or fluid emulsion. Care should be taken to see that air bubbles are not entrapped and impurities are eliminated. The emulsion may be reduced in thickness by pressure between the supporting plates until it forms but a very thin layer between the two plates. For example, a diffusing emulsion not over .01 inch in thickness has been found to give highly satisfactory results.

While the device has been described as employing two plates between which the emulsion is to be positioned, it is to be understood that the supporting plates may not be necessary to a proper functioning of the screen. It may be proper under certain circumstances to form the emulsion, compress it and set it, and then strip it from the supporting plates. The set emulsion, which may then be self-supporting, is adapted to function as a diffusing screen. So also, if the screen is to be employed, for example, in a horizontal position, it may be found desirable to use only a single supporting plate on which a plastic or semi-fluid emulsion may be spread. Such a single plate may be employed also with a semi-plastic or set emulsion in any position.

The operation of the device is illustrated diagrammatically in Fig. 3, which is intended to represent a minute portion of the diffusing emulsion and to illustrate how the emulsion functions to cause substantially complete diffusion of refracted beams of light.

In Fig. 3 the portion of the emulsion 11 shown, which comprises a continuous phase 12 and a discontinuous phase 13 of another medium having a refractive index differing from that of the medium forming the continuous phase, is shown as positioned in the path of a parallel pencil of light 14. As shown this beam or pencil of light may comprise a number of parallel rays designated at 15a, 15b, etc. When these rays enter the diffusing emulsion they may be substantially parallel, and they may remain parallel until they strike a surface between a globule or sphere 13 and the surrounding medium 12. Since the particles 13 and the medium 12 are of different refractive indices the rays 15 of the beam 14 are bent and reflected from and refracted through the surface between the medium and the particle 13. It is desirable to keep the difference between the index of refraction of the continuous phase and that of the discontinuous phase small, so that the ratio of refracted to reflected light at the surface of each globule is high.

In Fig. 3 the ray 15a is shown as impinging upon the surface formed between a globule 13 and the surrounding medium 12 at 16a and at an angle such that this ray is relatively largely reflected from the surface. The ray 15d is shown impinging upon the same surface at a point 16d, at an angle such that the ray is refracted through the surface. It will be obvious that as the rays traverse the diffusing emulsion their directions of propagation are repeatedly altered so that the rays emerge from the emulsion traveling in a wide variety of different directions, i. e., the pencil-like beam of light 14 has been substantially completely diffused in its passage through the emulsion.

The preferred size for the particles of the discontinuous phase is several microns in diameter. Where the screen is large and is to be viewed from a distance, they may, however, be larger.

An emulsion of the character described may be adapted to form a translucent screen admirably fit for use in connection with the so-called rear projection of stereoscope stills, motion pictures and the like. It functions to diffuse and transmit the image-carrying beam substantially without depolarization, and is hence adapted for use in stereoscopic picture projection systems employing polarized light. Such a screen may also be useful wherever a light-diffusing sheet, such as a ground glass sheet, may be employed, and has several advantages over such a ground glass sheet, among which may be mentioned better definition of the image and more uniform illumination over the screen with greater freedom from scintillation and the so-called "hot spot."

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Having described my invention, what I claim as new and desire to secure by Letters Patent is:

1. A translucent screen comprising a thin, sheet-like, set emulsion comprising a plurality of transparent media of different refractive indices, one medium forming a continuous phase, the other medium comprising a multiplicity of minute, transparent, substantially colorless, discrete particles distributed throughout said first-mentioned medium as a discontinuous phase, each medium having an index of refraction greater than that of air, the difference between the index of refraction of the medium forming the continuous phase and the index of the medium forming the discontinuous phase being small, whereby the ratio of refracted to reflected light at the interfaces between said media is high, the particles of the medium forming the discontinuous phase having non-planar and non-parallel surfaces, and having an over-all diameter greater than one micron.

2. A translucent screen comprising a thin, sheet-like, set emulsion comprising a plurality of transparent media of different refractive indices, one medium forming a continuous phase, the other medium comprising a multiplicity of minute, transparent, substantially colorless, discrete particles distributed throughout said first-mentioned medium as a discontinuous phase, each medium having an index of refraction greater than that of air, the difference between the index of refraction of the medium forming the continuous phase and the index of the medium forming the discontinuous phase being small, whereby the ratio of refracted to reflected light at the interfaces between said media is high, the particles of the medium forming the discontinuous phase having non-planar and non-parallel surfaces, and having an over-all diameter greater than one micron, the medium forming the continuous phase comprising a plasticized, cellulosic material.

3. A translucent screen comprising a thin, sheet-like, set emulsion comprising a plurality of transparent media of different refractive indices, one medium forming a continuous phase, the other medium comprising a multiplicity of minute, transparent, substantially colorless, discrete particles distributed throughout said first-mentioned medium as a discontinuous phase, each medium having an index of refraction greater than that of air, the difference between the index of refraction of the medium forming the continuous phase and the index of the medium forming the discontinuous phase being small, whereby the ratio of refracted to reflected light at the interfaces between said media is high, the particles of the medium forming the discontinuous phase having non-planar and non-parallel surfaces, and having an over-all diameter greater than one micron, and a plurality of transparent, rigid supporting sheets, the said set emulsion being positioned between and bonded to said sheets.

4. A translucent screen comprising a sheet of a transparent synthetic resin having distributed therethrough a multiplicity of minute, discrete, closely adjacent, irregularly shaped globules of a transparent oil, the boundary surfaces between the globules of oil and the synthetic resin being non-planar and non-parallel, the ratio of the indices of refraction of the resin and the oil being small, the globules of oil having at least one dimension longer than 700 millimicrons.

5. A translucent screen comprising a sheet of a set, transparent plastic having distributed therethrough a multiplicity of minute, closely adjacent, transparent particles of such shape that the boundary surfaces between the particles and the plastic are non-parallel, the particles having one dimension substantially longer than the wave lengths of visible light, the indices of refraction of the plastic and the distributed particles differing only slightly for light of any direction of vibration, whereby the ratio of refracted to reflected light at each surface between a particle and the said plastic is high.

6. A translucent screen comprising a sheet of a set, transparent plastic having distributed therethrough a multiplicity of minute, closely adjacent, transparent particles of such shape that the boundary surfaces between the particles and the plastic are non-parallel, the particles having one dimension substantially longer than the wave lengths of visible light, the indices of refraction of the plastic and the distributed particles differing only slightly for light of any direction of vibration, the plastic having an index of refraction higher than the distributed particles.

EDWIN H. LAND.